United States Patent [19]

Miyakoshi et al.

[11] Patent Number: 5,459,177
[45] Date of Patent: Oct. 17, 1995

[54] ADHESIVE FOR SOFT TISSUE AND KIT THEREOF

[75] Inventors: Shoichi Miyakoshi, Sodegaura; Takashi Inoue, Mitaka; Masaki Shimono, Chiba, all of Japan

[73] Assignee: Sun Medical Co., Ltd., Moriyama, Japan

[21] Appl. No.: 207,167

[22] Filed: Mar. 8, 1994

[30] Foreign Application Priority Data

Mar. 9, 1993 [JP] Japan .................................. 5-075231
Mar. 9, 1993 [JP] Japan .................................. 5-075232

[51] Int. Cl.$^6$ ........................... C08F 22/10; C08L 33/06; C08K 3/38
[52] U.S. Cl. ........................ 523/111; 523/105; 524/533; 524/560; 524/833; 526/323.1; 526/323.2; 526/271; 526/329.5
[58] Field of Search ...................... 524/560, 833, 524/533; 526/323.1, 323.2, 271, 329.5; 523/111, 105

[56] References Cited

U.S. PATENT DOCUMENTS

| | | | |
|---|---|---|---|
| 3,121,021 | 2/1964 | Copeland | 428/315.5 |
| 4,657,941 | 4/1987 | Blackwell et al. | 522/90 |
| 4,824,876 | 4/1989 | Matsumoto et al. | 523/116 |
| 5,264,215 | 11/1993 | Nakabayashi et al. | 523/115 |

FOREIGN PATENT DOCUMENTS 394728 4/1960 Japan .

OTHER PUBLICATIONS

English text abstract of JP 3146579 (Jun., 1991).
English text abstract of JP 56–045412 (Apr., 1981).
English text abstract of JP 01–228868 (Sep., 1989).
English text abstract of JP 3193057 (Aug., 1991).
English text abstract of JP 80014108 (Apr., 1980).
Adhesive Dentistry, vol. 10, No. 1, pp. 9–16, (1992).

*Primary Examiner*—Paul R. Michl
*Assistant Examiner*—Andrew E. C. Merriam
*Attorney, Agent, or Firm*—Sherman and Shalloway

[57] ABSTRACT

An adhesive for soft tissue comprising at least one member selected from (meth)acrylic esters each containing an acid anhydride group represented by the specific formula (I) and derivatives of the (meth)acrylic esters represented by the specific formula (Ia), a (meth)acylate, a poly(meth)acrylate derived from a (meth)acrylate and a polymerization initiator; and a kit of an adhesive for soft tissue, comprising containers and, placed therein, the above ingredients. The adhesive for soft tissue and kit thereof according to the present invention are advantageous in that when the adhesive is applied to a wound on a soft tissue, at least one member selected from the above (meth)acrylic esters represented by the formula (I) and/or the derivatives thereof represented by the formula (Ia) together with a (meth)acrylate, contained in the adhesive, polymerizes irrespective of the presence of blood or body fluid, so that the adhesive undergoes strong bonding (conjugation) with the soft tissue and that further, the adhesive ensures low cytotoxicity to thereby ensure effective utilization in the treatment of a wound on a soft tissue, especially an integument, of an organism.

23 Claims, 7 Drawing Sheets

10 μm

10 μm

10 μm

ADHESIVE FOR SOFT TISSUE AND KIT THEREOF

TECHNICAL FIELD OF THE INVENTION

The present invention relates to an adhesive for soft tissue capable of bonding soft tissues, such as integuments, muscles, organs and blood vessels of organisms, and to a kit thereof. More particularly, the present invention is concerned with an adhesive for soft tissue not only capable of strongly bonding soft tissues of organisms irrespective of the presence of water attributed to blood and body fluids, etc., to thereby stop bleeding but also capable of protecting a wounded part until healing thereof, and with a kit thereof. Especially, the present invention is concerned with an adhesive for soft tissue which is suitable for application to a wounded part formed on an integument, such as skin.

TECHNICAL BACKGROUND OF THE INVENTION

When a wound is formed on a tissue of an organism, such as a skin, a muscle and an organ, by an operation, an accident or other causes, expeditiously stopping bleeding from the wound is one of the most critical matters from the viewpoint of the success of the operation and the sustenance of the healing power (activity) of the organism.

Hitherto, any rupture or wound formed on a soft tissue, such as a skin, a muscle, an organ and a blood vessel, has generally been kept sutured until it is completely healed.

However, not only must sutures be sterilized prior to use, but also suturing with firm knots requires skill.

In addition to the suturing, physical methods for stopping bleeding from wounded part are known, which include electrical, infrared and laser ray coagulations.

In these methods as well, there are problems that hemostasis requires skill, and that special instruments and devices are requisite. In particular, these methods have been unavailable for a first aid for slight skin wounds, etc.

Apart from the physical methods, another hemostasis is known in which a local hemostatic agent is applied to bleeding part. With respect to such a local hemostatic agent, attention is being drawn to an adhesive as a material capable of easily joining the edges of a wound (rupture).

Various adhesives for soft tissue are now known, which include a cyanoacrylate adhesive composed of an acrylic ester having a cyano group at its α-position and a fibrin paste obtained by mixing fibrinogen with thrombin.

The cyanoacrylate adhesive is characterized by requiring no sterilization. However, it has drawbacks in that when the adhesive is present between tissues, the natural joining or natural healing of the tissues is blocked, and that on the other hand, when a soluble substance is copresent so as not to block the union of the sections by the wound, the adhesion of the adhesive is decreased. Accordingly, a method is preferably adopted in which a piece of cloth of, for example, a polyester fiber having the adhesive applied thereto is pasted to a wounded part with contacting wound edges each other. Nevertheless, there has been a problem that the joining operation (inosculation) of the wound edges is not easy.

In case of applying an adhesive for joining cleaved blood vessels, there has been adopted a method in which first a support tube is inserted into each of the blood vessels, secondly the edges of the blood vessels are inosculated, thirdly three or four knotted stitches are put into the edges to fix the same, and finally the adhesive is applied to the inosculated part, or a method in which without the use of a support tube, the adhesive is applied to the part stitched and fixed. The use of the cyanoacrylate adhesive in these methods is accompanied by a problem that the blood flow must be stopped with a hemostat to stop bleeding, so that expeditious treatment cannot be performed.

The fibrin paste is produced by adding an aprotinin solution, thrombin, calcium chloride and other ingredients to human fibrinogen. The adhesive joins the edges of a wound by the blood coagulation action of the fibrinogen. However, the fibrin paste contains an ingredient obtained from a human (human fibrinogen) as indicated above, so that unfavorably, sterilization, especially treatment for inactivating various viruses, is inevitable. Further, there has been a problem that the adhesive strength is poor, so that in the event of an especially large wound, another fixing means, e.g., a suture, is required.

Moreover, the adhesive for use in the treatment of a wound (rupture) on a soft tissue of an organism not only must be nontoxic, but also should be able to join the edges of the wound irrespective of the presence of blood, body fluids, etc.

Therefore, there is a demand in the art for the development of an adhesive not only capable of expeditiously and easily joining the edges of a wound formed on a soft tissue of an organism by an operation or an accident irrespective of the presence of water attributed to blood, body fluids, etc. but also being nontoxic.

On the other hand, a traumatic or sticking adhesive plaster has been widely utilized for protecting a wounded part formed on an integument, such as skin and mucous membrane. A pressure sensitive skin adhesive has been used in such an adhesive plaster.

Various adhesives (pasting agents) may be used as the skin adhesive, which include acrylic adhesives such as a polymer obtained from an alkyl acrylate and acrylic acid (Japanese Patent Publication No. 31405/1977), a copolymer obtained from dodecyl methacrylate, (meth)acrylic acid and vinyl acetate (Japanese Laid Open Patent Publication No. 77167/1982), and a copolymer obtained from a (meth)acrylic ester having an intramolecular ether bond, acrylic acid and a (meth)acrylic ester (Japanese Laid Open Patent Publication No. 45412/1981). These acrylic pressure sensitive adhesives have advantageous properties that the tackiness to the skin is excellent, a good adherence is maintained for a prolonged period of time, contained drugs are not adversely deteriorated and the skin is not irritated, so that they are suitable for use as pressure sensitive adhesives.

Various types of the adhesive plasters each comprising a pressure sensitive adhesive base have been proposed and put into practical use. As such bases comprising pressure sensitive adhesives, those have been used which have tackiness and adherence over a broad range of temperatures, not exhibiting a tackiness decrease at low temperatures.

For example, for pasting to the skin, it is believed that a pressure sensitive adhesive base having desirable tackiness at about 30° C. is satisfactory. Actually, however, pressure sensitive adhesive bases each having strong tackiness at 5° to 10° C. or lower temperatures have been proposed and put into practical use.

The reasons for the use of these pressure sensitive adhesive bases to date would be as follows:

(i) there has been a general concept that the broader the temperature range in which the pressure sensitive adhesive is available, especially at low temperatures, the greater the practical value thereof; and (ii) the greater the adhesion of the pressure sensitive adhesive to the skin at low temperatures, the higher the sticking performance thereof to the human skin and the less the peeling thereof by the flex of the skin.

However, the above acrylic pressure sensitive adhesives are poor in hydrophilicity (capability of absorbing water) and air permeability, so that they have the following drawbacks.

(1) When the medical pressure sensitive adhesive sheet having the conventional pressure sensitive adhesive layer provided therein is pasted to a wounded part for a long time, a swell occurs and the skin at the wounded part becomes hypersensitive to even a slight stimulus by a drug, etc., to cause contact dermatitis. Further, it is likely that an abnormal growth of various bacteria and fungi take place to induce secondary inflammation.

For example, a medical pressure sensitive adhesive sheet for inhibiting the above swell and contact dermatitis of the skin is disclosed in Japanese Patent Publication No. 4728/1964, which comprises a porous fibrous base material and, superimposed thereon through an open-cell layer, a pasting agent of a copolymer comprising an alkyl acrylate and acrylic acid. This sheet is excellent in air permeability, so that it does not swell.

However, the above pressure sensitive adhesive sheet has a drawback in that the base material and the pressure sensitive adhesive layer permits permeation of liquids, such as water, so that the protection of the wounded part is unsatisfactory.

Japanese Patent Publication No. 14108/1980 discloses a medical pressure sensitive adhesive sheet comprising a film which is excellent in steam permeability, such as a polyurethane film, and, superimposed thereon, a pressure sensitive adhesive layer composed of an acrylate copolymer or polyvinyl ethyl ether having a hydrophilic group in its molecule. This sheet exhibits a relatively good air permeability, and the permeability of the base film for a liquid, such as water, is less, so that the wounded part can be protected relatively well.

However, with respect to this pressure sensitive adhesive sheet, the hydrophilicity of the pressure sensitive adhesive is poor, so that the swell and contact dermatitis of the skin cannot be effectively prevented.

(2) The acrylic pressure sensitive adhesive has a drawback in that the adhesion thereof to the surface of an adherend in the wet or moist conditions, for example, sweating skin, is poor, and that, after application, peeling is likely to occur by perspiration of a large amount of sweat.

(3) The acrylic pressure sensitive adhesive has a drawback in that, once being applied to the surface of the skin, it is difficult to wash it away with water.

(4) The acrylic pressure sensitive adhesive has a drawback in that the solubility of a water-soluble drug, such as those in the form of a sodium, a potassium, an ammonium or a hydrochloric acid salt, therein is so low that it is difficult to prepare a medical pressure sensitive adhesive sheet comprising an acrylic pressure sensitive adhesive containing such a water-soluble drug.

In Japanese Laid Open Patent Publication No. 228868/1989, a copolymer is disclosed as one for overcoming the above drawbacks (1) to (4) of the acrylic pressure sensitive adhesive, which copolymer comprises a (meth)acrylic ester derivative and/or a (meth)acrylamide derivative having a saturated hydrocarbon residue containing a quaternary ammonium salt, and polyvinylpyrrolidone and/or diacetonacrylamide.

However, the water resistance of this copolymer is poor due to the inclusion of a large amount of the quaternary ammonium salt, so that the copolymer becomes excessively soft upon being exposed to sweating, and that it remains unremoved on the skin when being applied and stripped in the form of a sheet.

Japanese Laid Open Patent Publication No. 193057/1991 discloses a hydrophilic polymer comprising at least one member selected from glycosylethyl (meth)acrylate and glycosylpropyl (meth)acrylate as an essential ingredient, and also a medical adhesive comprising the above hydrophilic polymer and a plasticizer. The hydrophilic polymer and the medical adhesive purpose an increase of hydrophilicity. Further, Japanese Laid Open Patent Publication No. 146579/1991 discloses that a pressure sensitive adhesive comprising 20 to 80% by weight of an acrylate and/or a methacrylate having a straight chain alkyl group having at least 16 carbon atoms as an ester residue and 80 to 20% by weight of an acrylate and/or a methacrylate having an alkyl group having 2 to 8 carbon atoms on the average as an ester residue exhibits satisfactory adhesion at a temperature at which it is applied or higher temperatures but has less adhesion at temperatures lower than the above as compared with the conventional pressure sensitive adhesives, so that the pain at the time of peeling from the skin is relieved.

However, the above adhesive and pressure sensitive adhesive are not satisfactory in the capability of sealing a wounded part, the adhesion in wet conditions and the maintenance of adhesion until the wounded part is healed.

That is, when an adhesive plaster provided with the above adhesive or pressure sensitive adhesive is applied to a wounded part, problems arise that a given amount of humidity is present in equilibrium between the adhesive layer and the skin to thereby cause a swell in the skin, and that the adhesive layer only adheres to the skin, so that it is not feasible to protect the wounded part until it is healed.

Therefore, the conventional adhesives and pressure sensitive adhesives (surgical tapes) cannot be stated to have the capability of satisfactorily sealing a wounded part so as to prevent secondary infection in the treatment of the wound. Further, the conventional adhesives and pressure sensitive adhesives have not satisfactory tackiness or adhesion in conditions in which they are in contact with water or in wet conditions attributed to bleeding and body fluid ooze from a wounded part. Still further, at or after the healing of the wounded part, it is preferred that the adhesive and the pressure sensitive adhesive spontaneously peel. In this point as well, it must be stated that the conventional adhesives and pressure sensitive adhesives are not satisfactory. In addition, from the viewpoint of transparency for visual check as well, those of the conventional adhesives and pressure sensitive adhesives are so low that a visual check of the wounded part there through is unfeasible.

The adhesive comprising (2-methacryloyloxy)trimellitate anhydride is described in U.S. Patent No. 4,148,988 issued on Apr. 10, 1979. In this patent, however, there is no disclosure relating to the application thereof to wounded part on soft tissue as proposed in the present invention.

Further, Masaka ("The Effective 4META/MMA-TBB Adhesive Resin on the Conservative Pulp Treatment", Nobuo Masaka, Adhesive Dentistry, 9–16, Vol. 10, No. 1, 1992) teaches that, in the application of an adhesive comprising (2-methacryloyloxy)trimellitate anhydride to teeth, the harm attributed to a direct contact thereof with the dental pulp is slight. However, there is also no disclosure relating to the application thereof to wounded part on soft tissues to

OBJECT OF THE INVENTION

In view of the above prior art, the present invention has been made. An object of the present invention is to provide an adhesive for soft tissue, which is one being low in cytotoxicity and exhibiting strong adhesion irrespective of the presence of water attributed to blood, body fluid, etc. at the time of bonding soft tissues, such as skin and other integuments, muscles, organs and blood vessels, which can easily and expeditiously join the edges of a wound and does not require sterilization prior to use, and which not only can protect the wounded part until it is healed, but also spontaneously peel from the soft tissues, e.g., skin, after the healing.

Another object of the present invention is to provide a kit of an adhesive for soft tissue, which ensures easy storage, and which is suitable for preparing the adhesive for soft tissue having the above properties.

SUMMARY OF THE INVENTION

The adhesive for soft tissue according to the present invention comprises at least one member selected from (meth)acrylic esters each containing an acid anhydride group represented by the following formula (I) and derivatives of the (meth)acrylic esters represented by the following formula (Ia), a (meth)acrylate, a poly(meth)acrylate derived from a (meth)acrylate and a polymerization initiator;

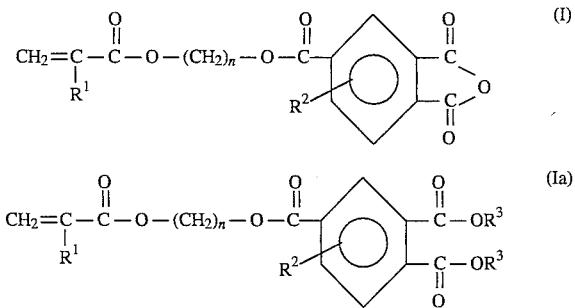

wherein n is an integer of 2 to 6; $R^1$ represents hydrogen or an alkyl group having 1 to 4 carbon atoms; $R^2$ represents hydrogen, an alkyl group having 1 to 4 carbon atoms or a carboxyl group; and each of $R^3$s independently represents hydrogen or an alkyl group having 1 to 4 carbon atoms, provided that when the one is an alkyl, the other is hydrogen.

In the adhesive for soft tissue according to the present invention, it is preferred that the above member selected from the group of the (meth)acrylic ester (I) and the derivative (Ia) thereof comprises:

a (meth)acrylic ester containing an acid anhydride group represented by the above formula (I), or a mixture of a (meth)acrylic ester containing an acid anhydride group represented by the above formula (I) and a derivative of the (meth)acrylic ester represented by the above formula (Ia).

Further, in the adhesive for soft tissue according to the present invention, it is preferred that n be 2 in the above formulae (I) and (Ia).

Still further, in the adhesive for soft tissue according to the present invention, it is preferred that the (meth)acrylic ester containing an acid anhydride group represented by the above indicated formula (I) be 4methacryloyloxyethyl trimellitate anhydride, the (meth)acrylate be methyl methacrylate, the poly(meth)acrylate be polymethyl methacrylate, and the polymerization initiator be tri-n-butylborane.

In particular, it is preferred that per part by weight of the (meth)acrylic ester containing acid anhydride group represented by the formula (I) and/or the derivatives represented by the formula (Ia) of the (meth)acrylic ester containing an acid anhydride group, the (meth)acrylate be present in an amount of 1 to 100 parts by weight, the poly(meth)acrylate be present in an amount of 0.1 to 100 parts by weight, and the polymerization initiator be present in an amount of 0.01 to 10 parts by weight.

When the adhesive for soft tissue according to the present invention is applied to a wounded part, the (meth)acrylic ester containing an acid anhydride group represented by the formula (I) and/or the derivative represented by the formula (Ia) together with the (meth)acrylate which are ingredients of the adhesive, shallowly permeate into the soft tissue and polymerize irrespective of the presence of blood or body fluid, so that the adhesive does not simply adhere to the soft tissue but undergoes strong bonding (conjugation) with the soft tissue to thereby strongly join the edges of the wound. Further, the adhesive for soft tissue according to the present invention ensures low cytotoxicity. Thus, the adhesive of the present invention not only can expeditiously stop bleeding from a wounded part, but also is fixed thereto to protect the wound until it is healed.

As described above, the adhesive for soft tissue according to the present invention is especially suitable for use on a wound on an integument, such as skin and mucous membrane. When the adhesive for soft tissue according to the present invention is applied to a wound on an integument, the edges of the wound are joined to heal the wound and, then, the adhesive spontaneously peels from the integument.

The kit of an adhesive for soft tissue according to the present invention comprises containers and, placed therein, at least one member selected from (meth)acrylic esters each containing an acid anhydride group represented by the above formula (I) and derivatives of the (meth)acrylic esters represented by the above formula (Ia), a (meth)acrylate, a poly(meth)acrylate derived from a (meth)acrylate, and a polymerization initiator.

In the kit of the present invention, it is preferred that the adhesive ingredients be placed in the containers in the composition and proportion described above as being preferred with respect to the adhesive for soft tissue according to the present invention.

In the kit of the present inventions, a desired adhesive for soft tissue can be produced by mixing together ingredients composed of at least one member selected from (meth)acrylic esters each containing an acid anhydride group represented by the above formula (I) and derivatives thereof represented by the above formula (Ia), a (meth)acrylate, a poly(meth)acrylate derived from a (meth)acrylate, and a polymerization initiator, the ingredients being put in containers. When this adhesive is applied to a bleeding wounded part, the (meth)acrylic ester containing an acid anhydride group represented by formula (I) and/or the derivative thereof represented by formula (Ia) together with the (meth)acrylate which are ingredients of the mixture, shallowly permeate into the soft tissue and polymerize irrespective of the presence of blood or body fluid, so that the adhesive does not simply adhere to the soft tissue but undergoes strong bonding (conjugation) with the soft tissue to thereby strongly join the edges of the wound. Thus, the above prepared adhesive not only can expeditiously stop bleeding from a wounded part, but also is fixed thereto to protect the wound until it is healed.

As indicated above, the kit of an adhesive for soft tissue according to the present invention is especially suitable for use on a wound of an integument, such as skin and mucous membrane. When the adhesive prepared using the kit according to the present invention is applied to a wound of an integument, the edges of the wound are joined and, then, the adhesive spontaneously peels from the integument after healing the wound.

DETAILED DESCRIPTION OF THE INVENTION

Figure 1:
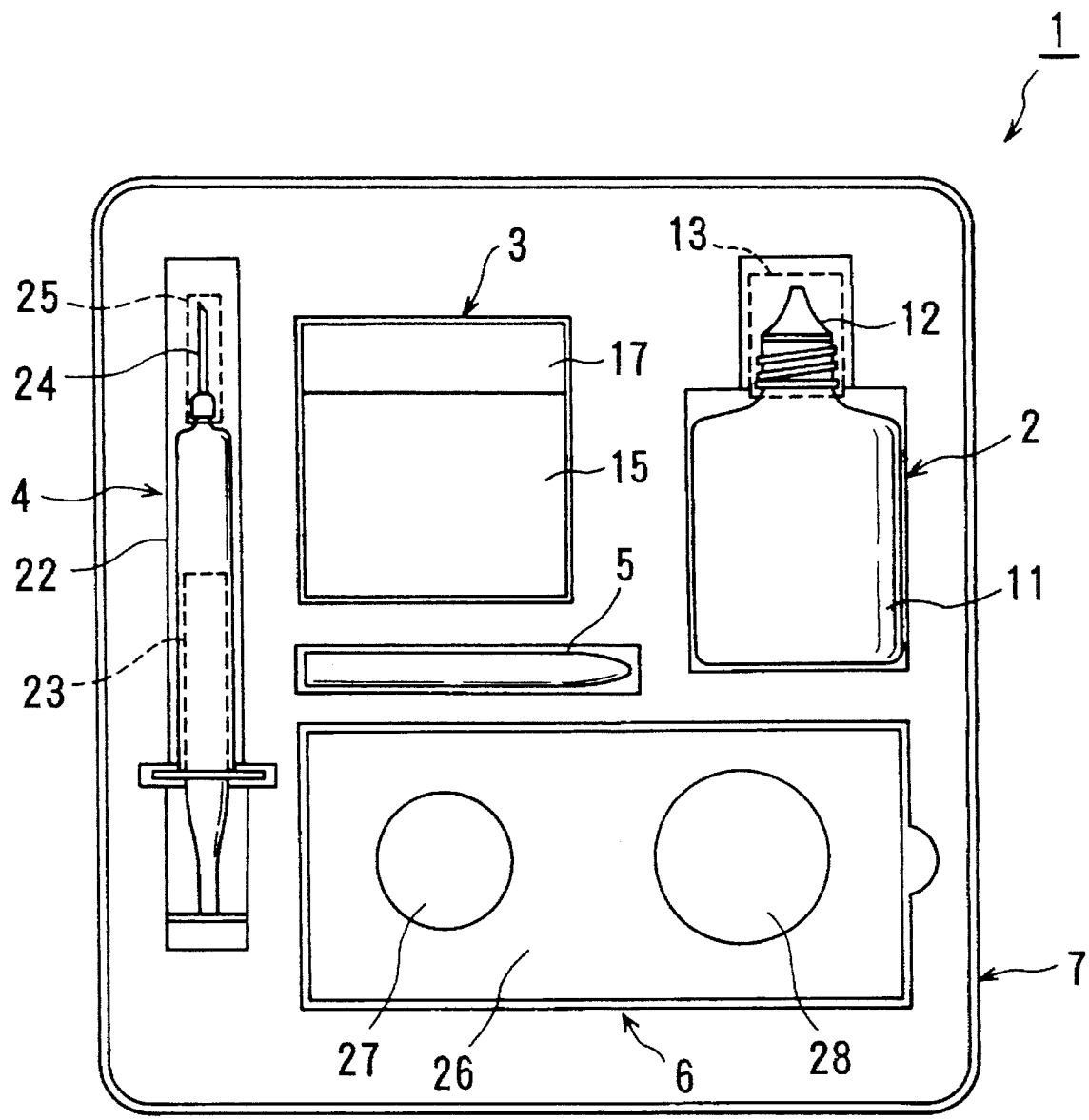
FIG. 1 is a plan view of a preferred embodiment of the kit of the adhesive for soft tissue according to the present invention.

Hereinbelow, the adhesive for soft tissue and kit thereof according to the present invention will be described in greater detail.

First, the adhesive for soft tissue according to the present invention will be described.

The adhesive for soft tissue according to the present invention contains at least one member selected from (meth)acrylic esters each containing an acid anhydride group represented by the following formula (I) and derivatives of the (meth)acrylic esters represented by the following formula (Ia),

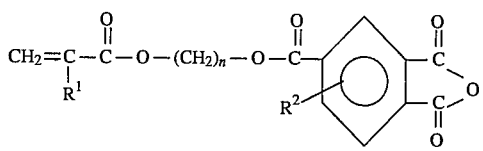

(I)

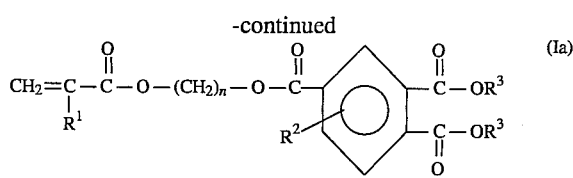

(Ia)

In the above formula (I), n is an integer of 2 to 6, preferably 2 to 4 and still preferably 2. $R^1$ represents hydrogen or an alkyl group having 1 to 4 carbon atoms, preferably an alkyl group having 1 or 2 carbon atoms. $R^2$ represents hydrogen, an alkyl group having 1 to 4 carbon atoms or a carboxyl group, preferably hydrogen.

Examples of (meth)acrylic esters each containing an acid anhydride group represented by the formula (I) for use in the present invention include 4-(2-methacryloyloxyethyl)trimellitate anhydride and 4-(2-methacryloyloxyethyl)hydrogen pyromellitate anhydride. Of these, 4-(2-methacryloyloxyethyl)trimellitate anhydride is preferred.

In the formula (Ia), n, $R^1$ and $R^2$ are as defined above in the formula (I). Each of $R^3$s independently represents hydrogen or an alkyl group having 1 to 4 carbon atoms, provided that when the one is an alkyl, the other is hydrogen.

The derivative represented by the formula (Ia) is either a hydrolysate obtained by reacting the acid anhydride group, forming a ring structure, of the (meth)acrylic ester containing an acid anhydride group represented by formula (I) with water to thereby open the ring structure into a pair of carboxyl groups, or a half ester obtained by esterifying one of the pair of carboxyl groups of the hydrolysate.

In the present invention, a compound selected from the (meth)acrylic ester containing an acid anhydride group represented by the formula (I) and the derivative thereof represented by the formula (Ia) is used as a polymerizable monomer. The (meth)acrylic ester containing an acid anhydride group represented by the formula (I) may be used individually or in combination with the derivative thereof represented by the formula (Ia).

In addition to the (meth)acrylic ester containing an acid anhydride group represented by the formula (I) and/or the derivative thereof represented by the formula (Ia), the adhesive for soft tissue according to the present invention comprises a (meth)acrylate, a poly (meth)acrylate and a polymerization initiator. When the adhesive for soft tissue is applied to a wounded part formed on a soft tissue, the edges of the wounded part are strongly bonded. Especially, the adhesive for soft tissue according to the present invention is suitable for use on a wound formed on integuments, such as skin and mucous membrane.

The (meth)acrylate suitable for use in the present invention includes:

alkyl monoacrylates of the formula $CH_2=CHCOOR$ (wherein R is an alkyl group having 1 to 4 carbon atoms), such as methyl acrylate, ethyl acrylate and propyl acrylate;

alkylene diacrylates of the formula $CH_2=CHCOO-R-OOCCH=CH_2$ (wherein R is a methylene group or an alkylene group having 2 to 4 carbon atoms), such as ethylene diacrylate and propylene diacrylate;

alkyl monomethacrylates of the formula $CH_2=C(CH_3)COOR$ (wherein R is an alkyl group having 1 to 4 carbon atoms), such as methyl methacrylate, ethyl methacrylate, propyl methacrylate and butyl methacrylate; and alkylene dimethacrylates of the formula $CH_2=C(CH_3)COO-R-OOC(CH_3)C=CH_2$ (wherein R is a methylene group or an alkylene group having 2 to 4 carbon atoms), such as ethylene dimethacrylate and propylene dimethacrylate. These acrylates and methacrylates may be used individually or in combination. Preferably, methyl methacrylate or a mixture of methyl methacrylate as a main ingredient and the other (meth)acrylate are used. The above acrylates and methacrylates are generally used in liquid state.

In the present invention, the above (meth)acrylate is used as a polymerizable monomer. It is used in an amount of generally from 1 to 100 parts by weight, preferably from 10 to 50 parts by weight, per part by weight of the (meth)acrylic ester containing an acid anhydride group represented by the formula (I) and/or the derivative thereof represented by the formula (Ia).

The poly(meth)acrylate to be used in the present invention includes those derived from (meth)acrylates.

The (meth)acrylate for use in the preparation of the poly(meth)acrylate may be the (meth)acrylates set forth above as the (meth)acrylate ingredient of the adhesive for soft tissue according to the present invention. The (meth)acrylates may be used individually or in combination, and are generally used in the form of a homogeneous solution or dispersion obtained by mixing with the above (meth)acrylic ester containing an acid anhydride group represented by the formula (I) and/or the derivative thereof represented by the formula (Ia) or the above (meth)acrylate.

Examples of poly (meth)acrylates include polymethyl methacrylate, polyethyl methacrylate, polypropyl methacrylate, and polybutyl methacrylate. These may be used individually or in combination.

The weight average molecular weight of the poly(meth)acrylate for use in the present invention is not particularly limited. It may be, for example, in the range of 300,000 to 600,000, preferably in the range of 400,000 to 500,000.

It is preferred that the poly(meth)acrylate be particulate so as to be highly soluble or dispersible in a mixture of the (meth)acrylic ester containing an acid anhydride group represented by the formula (I) and/or the derivative thereof represented by the formula (Ia), and the (meth)acrylate at the time of mixing. Such a particulate poly(meth)acrylate generally has an apparent density of 0.3 to 0.5 g/cm$^3$, preferably 0.35 to 0.40 g/cm$^3$.

In the present invention, the poly(meth)acrylate is used in an amount of generally from 0.1 to 100 parts by weight, preferably from 5 to 20 parts by weight, per part by weight of the (meth)acrylic ester containing an acid anhydride group represented by the formula (I) and/or the derivative thereof represented by the formula (Ia).

In the present invention, the poly(meth)acrylate is used to regulate the viscosity of a prepared adhesive. In particular, the viscosity of an adhesive prepared by polymerization can be lowered by decreasing the ratio of poly(meth)acrylate to (meth)acrylic ester containing an acid anhydride group represented by the formula (I) and derivative thereof represented by the formula (Ia) (or (meth)acrylate) contained in the adhesive. The lowering of the viscosity is advantageous for increasing the penetration into a soft tissue, especially an integument.

The polymerization initiator to be contained in the adhesive for soft tissue according to the present invention is not particularly limited as long as it is one generally employed in the polymerization of a (meth)acrylic compound at about room temperature. Examples of polymerization initiators include a redox catalyst system comprising benzoyl peroxide in combination with an amine, an alkylborane such as tri-n-butyl-borane and a partially oxidized alkylborane. Of these, tri-n-butylborane and a mixture of tri-n-butylborane and a partial oxide thereof obtained by addition of a small amount of water or reaction with water in the air or the part to which it is applied, are preferred.

The above polymerization initiator is used in an amount of generally from 0.01 to 10 parts by weight, preferably from 0.1 to 2.0 parts by weight, per part by weight of the (meth)acrylic ester containing an acid anhydride group represented by the formula (I) and/or the derivative thereof represented by the formula (Ia).

The adhesive for soft tissue according to the present invention may comprise an additive and a filler depending on physical, chemical and clinical properties required for the treatment of a particular wound, in addition to the above ingredients of the adhesive. Examples of such additives and fillers include antibiotics, such as penicillin, cephem, macrolide, chloramphenicol, tetracycline, lincomycin, aminoglycoside and polypeptides; bactericides, such as iodic compound preparations and boric acid preparations; other hemostatics, such as gelatin and cellulose preparations; wound protecting agents, such as sterilized and lyophilized hog skin; and collagenous membrane, collagenous grain and polylactic acid for increasing affinity with a soft tissue.

The adhesive for soft tissue according to the present invention is prepared by mixing the above ingredients just prior to application to an adhesion site, i.e., a wounded part to be treated. In the preparation of the adhesive for soft tissue, the mixing order of the (meth)acrylic ester containing an acid anhydride group represented by the formula (I) and/or the derivative thereof represented by the formula (Ia), the (meth)acrylate, the poly(meth)acrylate and the polymerization initiator is not particularly limited, and these may be mixed in any discretional sequence. However, from the viewpoint that a uniform mixture of the ingredients, especially the polymerizable monomers, can be obtained, it is preferred that the adhesive be prepared by first dissolving the (meth)acrylic ester containing an acid anhydride group represented by the formula (I) and/or the derivative thereof represented by the formula (Ia) in methyl (meth)acrylate and subsequently adding polymethyl (meth)acrylate and the polymerization initiator to the resultant solution. The preparation of the adhesive is generally conducted at 0° to 50° C., preferably 5° to 15° C.

When the thus prepared adhesive is applied to a wounded part on a soft tissue, the edges of the wound are strongly bonded not only at the body temperature but also at temperatures lower than the body temperature, close to room temperature. At the time of bonding, it is presumed that the adhesive shallowly permeates into the wounded tissue and polymerizes to solidify as a complex of the adhesive and the tissue of organism. Even if blood or body fluid is present in the wounded part, this adhesive solidifies with including components of the blood or body fluid, so that there is no significant decrease in the bonding strength realized by the adhesive. Further, upon application of this adhesive to a wound on a human integument, it has been found that not only does the adhesive expeditiously solidify irrespective of the presence of blood, but also the pain due to the wound is relieved or eliminated to thereby show that the adhesive has analgesic activity as well.

Moreover, when the adhesive for soft tissue according to the present invention is applied to a wounded part on an integument, such as skin, after bonding, the polymerized and solidified adhesive lies over the integument like a scab, which spontaneously peels after healing of the wound.

Thus, the adhesive for soft tissue according to the present invention is directly applicable to a wound formed on an integument, such as skin and mucous membrane, of an organism to thereby easily bond the edges of the wound. The adhesive is suitable for use in dermal graft.

Moreover, the adhesive for soft tissue according to the present invention is suitable for use in suturing a wound, and sealing a perforated part, formed by an accident, surgery, etc. on a muscular tissue; a membranous tissue, such as peritoneum and fascia; a tubular organ, such as esophagus, intestine, bile-duct, blood vessel, trachea and bronchus; and a parenchymatous organ, such as stomach, liver, kidney, spleen, lung and brain. With respect to a tubular organ, the adhesive can suitably be employed to inosculate cleaved parts.

Further, the adhesive for soft tissue according to the present invention can be used to bond a soft tissue with a hard tissue, such as bone, or to bond a soft tissue with an artificial organ.

Now, the kit of an adhesive for soft tissue according to the present invention will be described.

The kit of an adhesive for soft tissue according to the present invention includes a container in which at least one member selected from (meth)acrylic esters each containing an acid anhydride group represented by the above formula (I) and derivatives of the (meth)acrylic esters represented by the above formula (Ia) is placed.

Examples of (meth)acrylic esters each containing an acid anhydride group represented by formula (I) for use in the kit of the present invention include 4-(2-methacryloyloxyethyl)trimellitate anhydride and 4-(2-methacryloyloxyethyl)hydrogen pyromellitate anhydride. Of these, 4-(2-methacryloyloxyethyl)trimellitate anhydride is preferred.

In the present invention, a compound selected from the (meth)acrylic esters each containing the acid anhydride group represented by the formula (I) and the derivatives thereof represented by the formula (Ia) is used as a polymerizable monomer. The (meth)acrylic ester containing an acid anhydride group represented by the formula (I) may be used individually or in combination with the derivative thereof represented by the formula (Ia).

The (meth)acrylic ester containing an acid anhydride group represented by the formula (I) and/or the derivative thereof represented b the formula (Ia), in the present invention, is put, stored and provided in an appropriate container of glass or a synthetic resin, such as polyethylene and polypropylene. For storage, the (meth)acrylic ester containing an acid anhydride group represented by the formula (I) and/or the derivative thereof represented by the formula (Ia) per se may be put in the above container. Alternatively, a mixture thereof with the (meth)acrylate may be put in the container, as described below.

The kit of the present invention includes containers in which other ingredients, i.e., the (meth)acrylate, the poly(meth)acrylate and the polymerization initiator, are placed, in addition to that containing the (meth)acrylic ester containing an acid anhydride group represented by the formula (I) and/or the derivative thereof represented by the formula (Ia).

Acrylates and methacrylates set forth above as composing the adhesive for soft tissue according to the present invention are used as the (meth)acrylate in the kit of the present invention.

In the present invention, like the (meth)acrylic ester containing an acid anhydride group represented by the formula (I) and/or the derivative thereof represented by the formula (Ia), the (meth)acrylate is a polymerizable monomer in an adhesive prepared therefrom in combination with other ingredients. In the preparation of an adhesive, the (meth)acrylate is used in an amount of generally from 1 to 100 parts by weight, preferably from 10 to 50 parts by weight, per part by weight of the (meth)acrylic ester containing an acid anhydride group represented by the formula (I) and/or the derivative thereof represented by the formula (Ia).

The (meth)acrylate or the mixture of (meth)acrylates are used in the liquid state, and placed, stored and provided in a container in the present invention. As mentioned above, the (meth)acrylate may be placed in a container in the form of a mixture with the (meth)acrylic ester containing an acid anhydride group represented by the formula (I) and the derivative thereof represented by the formula (Ia).

The container in which the (meth)acrylate or the mixture thereof is placed may be composed of a glass capable of shading the light or a synthetic resin having gas barrier property, not corroded by (meth)acrylate ingredients. Examples of containers composed of such a synthetic resin include containers each comprising a wall of a single layer of polypropylene, a polyamide or a polyester, and containers each comprising a wall having three-layered structure composed of polyethylene, polyamide and polyethylene or a wall having three layered structure composed of polyethylene, a copolymer of ethylene and vinyl alcohol, and polyethylene.

The above container may comprise dropping means by which a liquid can be dropwise added. For example, a desirable container may be obtained by molding a flexible synthetic resin as indicated above into a container and providing an opening of the container with a tapered nozzle.

The poly(meth)acrylate for use in the kit of the present invention is derived from a (meth)acrylate. In particular, the poly(meth)acrylates mentioned above as composing the adhesive for soft tissue according to the present invention are used as the poly(meth)acrylate in the kit of the present invention.

In the present invention, at the preparation of an adhesive, the poly(meth)acrylate is used in an amount of generally from 0.1 to 100 parts by weight, preferably from 5 to 20 parts by weight, per part by weight of the (meth)acrylic ester containing an acid anhydride group represented by the formula (I) and/or the derivative thereof represented by the formula (Ia).

In the present invention, the poly(meth)acrylate is used to regulate the viscosity of a prepared adhesive and the strength of a solidified adhesive. In particular, the viscosity of an adhesive prepared by polymerization can be lowered by decreasing the ratio of poly(meth)acrylate to (meth)acrylic ester containing an acid anhydride group represented by the formula (I) and derivative thereof represented by the formula (Ia) (or (meth)acrylate) contained in the adhesive. The poly(meth)acrylate in particulate (powdery) form may be placed, stored and provided in a container of glass or a synthetic resin, such as a polyolefin. This container may be equipped with means for measuring the poly(meth)acrylate, e.g., a measuring spoon having a bowl portion, with which the volume of powder can be measured by moving a bar on the brim of the bowl portion to take out a desired amount of the powder.

The polymerization initiator to be employed in the kit of the present invention is not particularly limited as long as it is one generally used in the polymerization of a (meth)acrylic compound at about room temperature. Examples of polymerization initiators include a redox catalyst system comprising benzoyl peroxide in combination with an amine, an alkylborane such as tri-n-butylborane and a partially oxidized alkylborane. Of these, tri-n-butylborane and a mixture of tri-n-butylborane and a partial oxide thereof obtained by addition of a small amount of water or reaction with water in the air or the part to which it is applied, are preferred. At the preparation of an adhesive, the above polymerization initiator is used in an amount of generally from 0.01 to 10 parts by weight, preferably from 0.1 to 2.0 parts by weight, per part by weight of the (meth)acrylic ester containing an acid anhydride group represented by the formula (I) and/or the derivative thereof represented by the formula (Ia).

In the present invention, the above polymerization initiator is placed, stored and provided in a container. Preferably, such a container is one capable of inhibiting contact with moisture present in the air and permitting dropwise addition. For example, it is a syringe of glass, a polyester, a polyamide, a fluorinated rubber or a silicone rubber.

The kit of an adhesive for soft tissue according to the present invention may comprise an additive and a filler depending on physical, chemical and clinical properties required for the treatment of a particular wound, in addition to the containers containing the above ingredients of the adhesive. Examples of such additives and fillers include antibiotics, such as penicillin, cephem, macrolide, chloramphenicol, tetracycline, lincomycin, aminoglycoside and polypeptides; bactericides, such as iodic compound preparations and boric acid preparations; other hemostatics, such as gelatin and cellulose preparations; and wound protecting agents, such as sterilized and lyophilized hog skin. These additives and fillers may be mixed into the above other ingredients, or placed and stored in separate containers.

In the use of the kit of an adhesive for soft tissue according to the present invention, the adhesive can easily be prepared by mixing the above ingredients in the containers just prior to application to a hemostatic site, i.e., a wounded part at which bleeding is to be stopped. In the preparation of the adhesive for soft tissue, the mixing order of the (meth)acrylic ester containing an acid anhydride group represented by the formula (I) and/or the derivative thereof represented by the formula (Ia), the (meth)acrylate, the poly(meth)acrylate and the polymerization initiator is not particularly limited, and these may be mixed in any discretional sequence. However, from the viewpoint that a uniform mixture of the ingredients, especially the polymerizable monomers, can be obtained, it is preferred that the adhesive be prepared by first dissolving the (meth)acrylic ester containing an acid anhydride group represented by the formula (I) and/or derivative thereof represented by the formula (Ia) in methyl (meth)acrylate and subsequently adding polymethyl (meth)acrylate and the polymerization initiator to the resultant solution. The preparation of the adhesive can be performed at a broad range of temperatures including room temperature, but is generally conducted at 0° to 50° C., preferably 5° to 15° C.

The kit of an adhesive for soft tissue according to be present invention by which the adhesive can be prepared as described above may further comprise instruments for mixing and/or applying the ingredients in addition to the containers containing the ingredients. Such instruments include agitating means for mixing the ingredients, such as a pallet, a spatula and a stirring rod, coating means for applying a prepared adhesive, such as a brush, and a solvent for cleaning the above means.

The pallet as agitating means may be composed of, for example, an earthware having its surface converted to a poreless smooth surface by applying a glaze and firing, or a synthetic resin being chemically resistant to the ingredients, such as polyethylene, polypropylene and other polyolefins. The spatula and stirring rod as other agitating means may also be composed of the above synthetic resin.

The brush as coating means may comprise bristles selected from those of synthetic resins being chemically resistant to the ingredients and animal bristles. Examples of solvents for cleaning include organic solvents, such as acetone.

A preferred embodiment of the kit of an adhesive for soft tissue according to the present invention will now be described in detail referring to FIGS. 1, 2 and 3.

FIG. 1 is a plan view of a preferred embodiment of the kit of an adhesive for soft tissue according to the present invention. FIG. 2 is a perspective view of a container for the poly(meth)acrylate. FIG. 3 is a perspective view of a measuring spoon disposed in the container for the poly-(meth)acrylate.

As shown, this embodiment of the kit of an adhesive for soft tissue, indicated at 1, comprises a case 7 and, disposed therein, a monomer mixture container 2 in which a mixture of the (meth),acrylic ester containing an acid anhydride group represented by the formula (I) and/or the derivative thereof represented by the formula (Ia) and the (meth)acrylate, a poly(meth)acrylate container 3, a polymerization initiator container 4, a spatula 5 for mixing and a pallet 6 for mixing. The case 7 can be closed with a lid not shown.

The monomer mixture container 2 comprises a body 11 composed of a synthetic resin and, provided at an opening thereof, a nozzle 12 and a lid 13. The monomer mixture container 2 has a structure such that the monomer mixture can be dropwise dispensed by detaching the lid 13 and pressing the body 11 having flexibility. The body 11, the nozzle 12 and the lid 13 may each be composed of the resin described above as the material of the container in which the (meth)acrylate or its mixture is placed.

Figure 2:
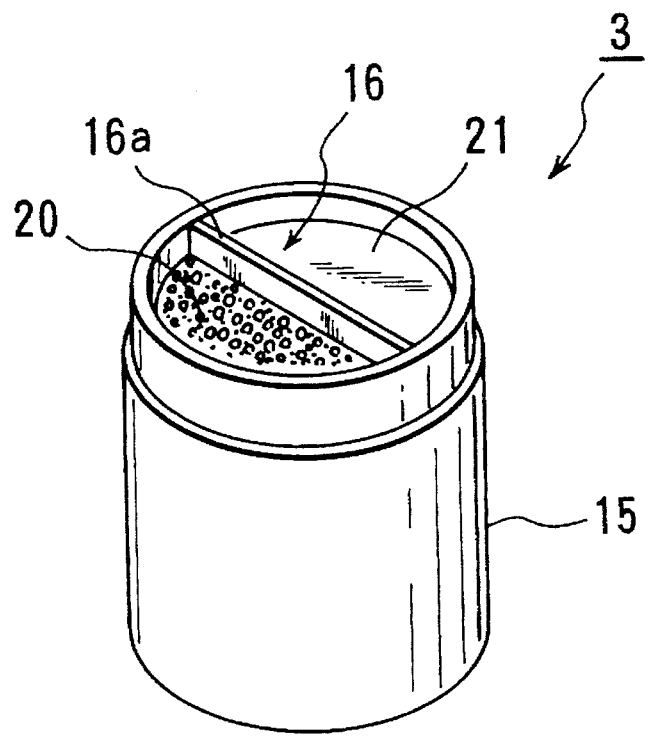
FIG. 2 is a perspective view of a container for a poly(meth)acrylate.

The container 3 for the poly(meth)acrylate comprises a cylindrical body 15, an inner lid 16 and a lid 17, as shown in FIGS. 1 and 2. The inner lid 16 has a partition 16a mounted on an upper side thereof. A takeoff port 20 for the stored poly(meth)acrylate and a recess 21 for disposing a measuring spoon 19 therein sandwich the partition 16a. This measuring spoon 19 comprises a measuring bowl 19a having a predetermined volume and a handle 19b, as shown in FIG. 3. A predetermined amount of powder of the poly-(meth)acrylate can be dispensed by moving a bar on the brim of the measuring bowl 19a.

Further, the polymerization initiator container 4 of the embodiment is a syringe comprising a piston 23 and a cylinder 22. The polymerization initiator can be dropped through a tip needle 24 by pushing the piston 23 in the cylinder 22 toward the tip thereof. In the figure, numeral 25 denotes a lid for protecting and hermetically enclosing the needle 24.

The pallet 6 for mixing comprises a flat base plate 26 having two recesses 27, 28 having different volumes formed on the top thereof.

In the above adhesive kit 1, a mixture of polymerizable monomers is placed in the single container 2, so that preparation of a uniformly mixed adhesive is facilitated. The adhesive ingredient may be dispensed from each of the containers 2 to 4 into either of the recess 27 having a smaller volume and the recess 28 having a larger volume of the pallet 6, followed by agitation with the spatula 5. Thus, the preparation of the adhesive according to the above method can be accomplished only by the use of the instruments included in the kit 1.

When the adhesive prepared using the above kit of the present invention is applied to a bleeding wounded part, it solidifies with incorporating components of a blood or body fluid to thereby expeditiously effect hemostasis, not only at the body temperature but also at temperatures lower than the body temperature, close to room temperature. Further, the adhesive accomplishes strong bonding (conjugation) with the wounded part to thereby protect the same until it is healed. Still further, upon application of this adhesive to a wound on a human integument, such as skin and mucous membrane, it has been found that not only does the adhesive expeditiously solidify irrespective of the presence of blood, but also the pain due to the wound is relieved or eliminated to thereby show that the adhesive has analgesic activity as well.

Moreover, when the above adhesive is applied to a wounded part on an integument, such as skin, after bonding, the polymerized and solidified adhesive lies over the integument like a scab, which spontaneously peels after healing of the wound.

Thus, the kit of an adhesive for soft tissue according to the present invention is advantageous in that the ingredients can be dispensed from the containers just prior to hemostasis and mixed to thereby prepare an adhesive, which can directly be applied to a wound formed on an integument, such as skin and mucous membrane, of an organism to thereby easily and expeditiously stop bleeding from the wounded part, and in that upon solidification, the adhesive can stick to and protect the wounded part until it is healed.

Moreover, the adhesive for soft tissue prepared using the kit of the present invention exhibits low cytotoxicity, and is suitable for use in hemostasis to be effected on a wound formed by an accident, surgery, etc. on a muscular tissue; a membranous issue, such as peritoneum and fascia; a tubular organ, such as esophagus, intestine, bile-duct, blood vessel, trachea and bronchus; and a parenchymatous organ, such as stomach, liver, kidney, spleen, lung and brain.

The toxicity in terms of $LD_{50}$ (median lethal dose) of the (meth)acrylic ester containing an acid anhydride group represented by the formula (I) for use in the present invention is 600–700 mg/kg in the intraperitoneal administration to mice and at least 2 g/kg in the oral administration to mice, and that of methyl acrylate is 8.4 g/kg in the oral administration to mice (W. Deichmann, J.Ind.Hyg.Toxicol, vol. 23, page 343, 1941). The toxicity in terms of $LD_{50}$ of a methyl methacrylate copolymer comprising 5% of the (meth)acrylic ester containing an acid anhydride group represented by the formula (I) is 2000 mg/kg in any of the intraperitoneal, subcutaneous and oral administrations to mice. Therefore, it is seen that the toxicities of the above substances are low. Incidentally, the toxicity in terms of $LD_{50}$ of ethyl cyanoacrylate is 500 mg/kg in the intraperitoneal administration to mice, and that of methyl cyanoacrylate is 180 mg/kg in the oral administration to rats (Survey of Toxicity Data on Chemical Substance, edited by the U.S. National Labor, Safety and Hygiene Institute). The amount of adhesive applied onto a wounded part is slight, and the application is generally made only once to heal the wound, so that any possible adverse effect on organisms at use would be extremely trivial.

EFFECT OF THE INVENTION

As described above, the adhesive for soft tissue according to the present invention comprises at least one member selected from specific (meth)acrylic esters each containing an acid anhydride group represented by the formula (I) and derivatives thereof represented by the formula (Ia), a (meth)acrylate, a poly(meth)acrylate and a polymerization initiator. Therefore, when this adhesive is applied to a wound on a soft tissue, especially an integument, the at least one member selected from the (meth)acrylic esters each containing the acid anhydride group represented by the formula (I) and the derivatives thereof represented by the formula (Ia) together with the (meth)acrylate, contained in the adhesive, shallowly penetrates into the soft tissue and expeditiously polymerizes irrespective of the presence of blood or body fluid, so that the adhesive does not simply adhere to the soft tissue but undergoes strong bonding (conjugation) with the soft tissue to thereby strongly join the edges of the wound. Further, the adhesive for soft tissue ensures low cytotoxicity. Thus, the adhesive of the present invention can be effectively utilized in the treatment of a wound on a soft tissue, especially an integument, of an organism.

The kit of an adhesive for soft tissue according to the present invention comprises containers and, placed therein, the (meth)acrylic ester containing the acid anhydride group represented by the formula (I) and/or the derivative thereof represented by the formula (Ia), a (meth)acrylate, a poly(meth)acrylate and a polymerization initiator. A desired adhesive for soft tissue can easily be prepared by dispensing appropriate amounts of ingredients from the containers and mixing together the same. When this adhesive is applied to a bleeding wounded part, the (meth)acrylic ester containing an acid anhydride group represented by the formula (I) and/or the derivative thereof represented by the formula (Ia) together with the (meth)acrylate contained in the mixture, shallowly penetrate into the soft tissue and polymerizes irrespective of the presence of blood or body fluid, so that the adhesive does not simply adhere to the soft tissue but undergoes strong bonding (conjugation) with the soft tissue to thereby strongly join the edges of the wound. Thus, the above prepared adhesive can expeditiously stop bleeding from the wounded part. Further, the adhesive exhibits low cytotoxicity. Therefore, the adhesive is suitable for use in hemostasis of wounds formed on various internal tissues and organs. When the adhesive is applied to a wound on an integument, it is fixed to the wound-formed part with desirable strength to protect the same until it is healed. Hence, the adhesive can suitably be employed in a first aid for a wound on skin.

That is, the pre,sent invention provides the adhesive for soft tissue having the following advantages:

(1) the adhesion of the adhesive for soft tissue according to the present invention to a soft tissue, especially an integument such as skin and mucous membrane, is excellent, which can be maintained for long, and it does not irritate the integument;

(2) even if the adhesive for soft tissue according to the present invention is directly applied to a wounded part for long, neither swell nor contact dermatitis occurs; and the adhesive can easily be applied to a wet or moist integumentary surface, it does not easily peel irrespective of sweating, and work using water can be performed while having the adhesive applied;

(3) once the wounded part is healed, the adhesive for soft tissue according to the present invention spontaneously peels from the soft tissue, so that any special labor is not required for peeling, and that damaging of the integument by peeling can be prevented; and (4) no special raw materials are used in the preparation of the adhesive for soft tissue according to the present invention, and the adhesive can be widely used as an adhesive for a soft tissue, especially an integument.

EXAMPLES

Hereinbelow, the adhesive for soft tissue and the kit thereof according to he present invention will be described in greater detail with reference to the following Examples, which should not be construed as limiting the scope of the invention.

EXAMPLE 1

(Toxicity test)

An agar mixture was prepared by adding 3.75 g of powdery agar to 125 ml of distilled water and subjecting the mixture to a high pressure sterilization for 15 min. Separately, proliferative culture medium I (Eagles's minimum essential medium: 20%, fetal calf serum: 200 I.U./ml, penicilin: 200 µg/ml, streptomycin: 20 mM HEPES) was prepared. The proliferative culture medium I and the agar mixture were incubated in a thermostat kept at 37°–40° C., and 100 ml aliquots were taken therefrom and mixed well under agitation. The resultant mixture was dispensed by 7.2 ml onto culture dishes each having a diameter of 60 mm, and solidified at room temperature to obtain agar plates.

Subcultured L-929 strain cells were rinsed with 5 ml of trypsin-EDTA solution, and 5 ml of trypsin-EDTA solution was added to the rinsed L-929 strain cells and allowed to stand still for about 15 min. Then, peeled cells were suspended by pipetting. This cell suspension was centrifuged, and a supernatant was discarded. Added to the resultant cells was proliferative culture medium II (Eagles's minimum essential medium: 10% fetal calf serum: 100 I.U./ml, penicilin: 100 µg/ml, streptomycin: 10 mM, $NaHCO_3$: 10 mM HEPES) to effect resuspension. The number of cells in the suspension were counted, and proliferative culture medium II was further added so as to adjust the cell concentration to $1.5 \times 10^5$ cells/ml.

The thus obtained suspension was dispensed by 8.6 milliliters on millipore filters (diameter: 47 mm, pore size of membrane: 0.45 µm) disposed on respective culture dishes each having a diameter of 60 mm, and cultured in 5% carbon dioxide for 24 hr. After culturing, the culture medium was removed. The resultant millipore filters having proliferated cells attached thereto were rinsed with Dulbecco's phosphate buffered saline kept at 37° C. The millipore filters having cells attached thereto were gently superimposed, with its cell-attached side down, on the above previously prepared agar plates, respectively.

12 Parts by weight of 4-methacryloyloxyethyl trimellitate anhydride and 231 parts by weight of methyl methacrylate were mixed to obtain a homogeneous solution. 140 Parts by weight of polymethyl methacrylate (average molecular weight: 430,000, apparent density: 0.37 g/cm$^3$) was added to the solution, and agitated to obtain a mixture. Subsequently, 6.5 parts by weight of tri-n-butylborane was added dropwise to the mixture at 10° C. while stirring to prepare an adhesive. The adhesive was dispensed by about 0.2 ml at just after the preparation (specimen 1), 1 min after the preparation (specimen 2), 5 min after the preparation (specimen 3), 10 min after the preparation (specimen 4), 60 min after the preparation (specimen 5) and 24 hr after the preparation (specimen 6), and put on the above millipore filters superimposed on respective agar plates. The specimens 1 to 6 were put by three specimens on the millipore filters. The cells attached to the millipore filters on the agar plates were cultured for 3 hr while keeping the specimens 1 to 6 placed on the filters.

After culturing, the specimens 1 to 6 were removed, and each of the millipore filters was transferred to a Petri dish containing 7 ml of a solution of a succinate dehydrogenase reaction substrate and incubated at 37° C. for 3 hr.

Thereafter, the millipore filters were successively rinsed four times with four Petri dishes each containing distilled water, and dried on filter papers.

On each of the thus prepared dry millipore filters, the stainability at a part where a specimen had been put was compared with that at other parts. Cytotoxicity was evaluated under the criteria that the toxicity was nil when the stainability at a part where a specimen had been put was identical with that at other parts; weak when the stainability at a zone of 7 mm or less in diameter covering the part where a specimen had been put was extinguished or lowered; medium when the stainability at a zone of 7 to 11 mm in diameter covering the part where a specimen had been put was extinguished or lowered; and strong when the stainability at a zone of 12 mm or more in diameter covering the part where a specimen had been put was extinguished or lowered.

As a result, it was judged that the toxicities of specimens 1, 2 and 3 were weak, the toxicity of specimen 4 was still weak but less than those of specimens 1 to 3 and the toxicities of specimens 5 and 6 were nil.

EXAMPLE 2

An adhesive was prepared in the same manner as in Example 1, and applied onto a slice of hog liver having a thickness of about 5 mm. Another slice of hog liver was superimposed on the adhesive-applied slice, and allowed to stand still at 18° C. for 1 hr. As a result, it became unfeasible to separate the joined two liver slices at the bonded parts without tissue break.

The adhesive-applied liver slices were immersed in concentrated hydrochloric acid for one day. The undissolved materials were washed with deionized water, and dried in vacuo at room temperature. The surface of the thus obtained dry undissolved part was observed by a scanning electron microscope.

Figure 4:
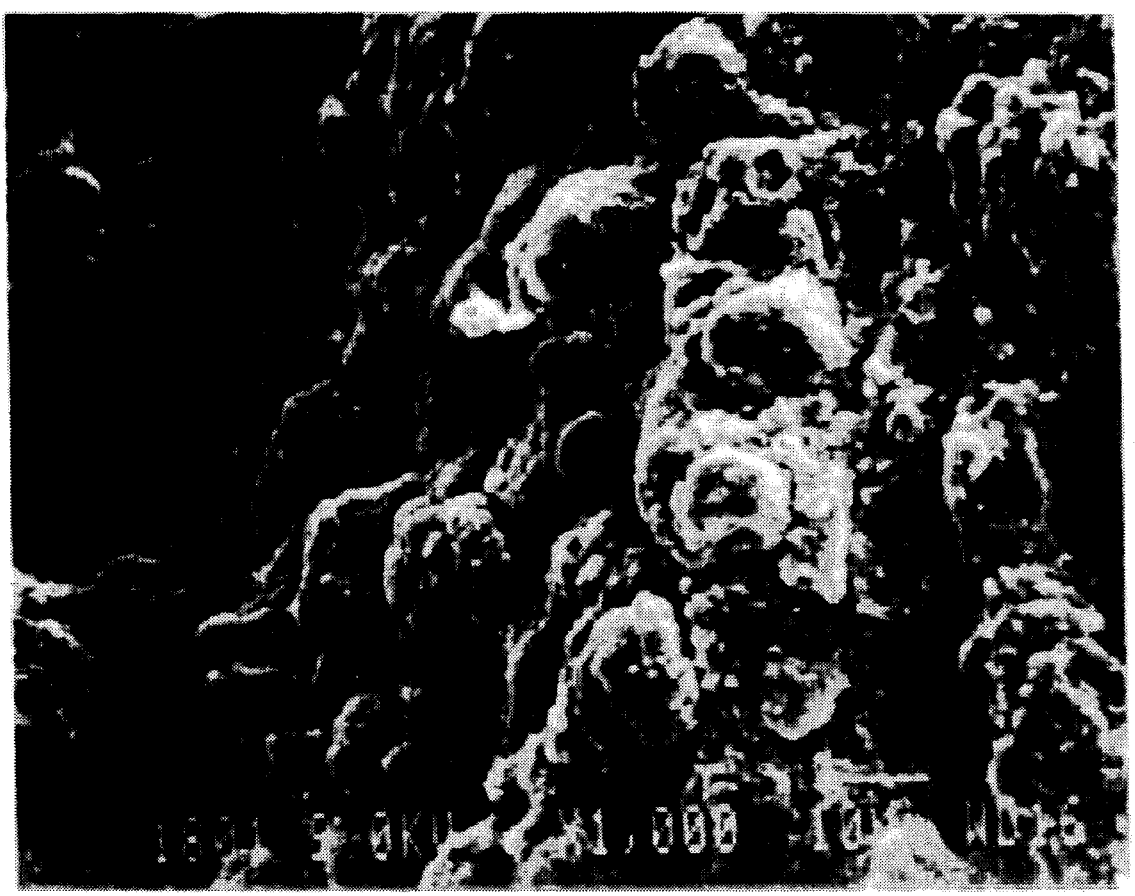
FIG. 4 is a scanning electron micrograph of bonded parts of hog liver slices joined by the adhesive of the present invention as described in Example 2.

As a result, a scanning electron micrograph as shown in FIG. 4 was obtained. FIG. 4 shows that the undissolved part is a bonded part at which an image believed to be a solidified liver tissue is observed, and thus suggests that the adhesive ingredients penetrate into the liver tissue and polymerize to solidify, thereby forming a complex of tissue and polymerized adhesive.

EXAMPLE 3

Tissue slices were bonded and a part undissolved in concentrated hydrochloric acid was observed by a scanning electron microscope in the same manner as in Example 2, except that slices of hog muscle each having a thickness of about 5 mm were used as tissues to be bonded.

Figure 5:
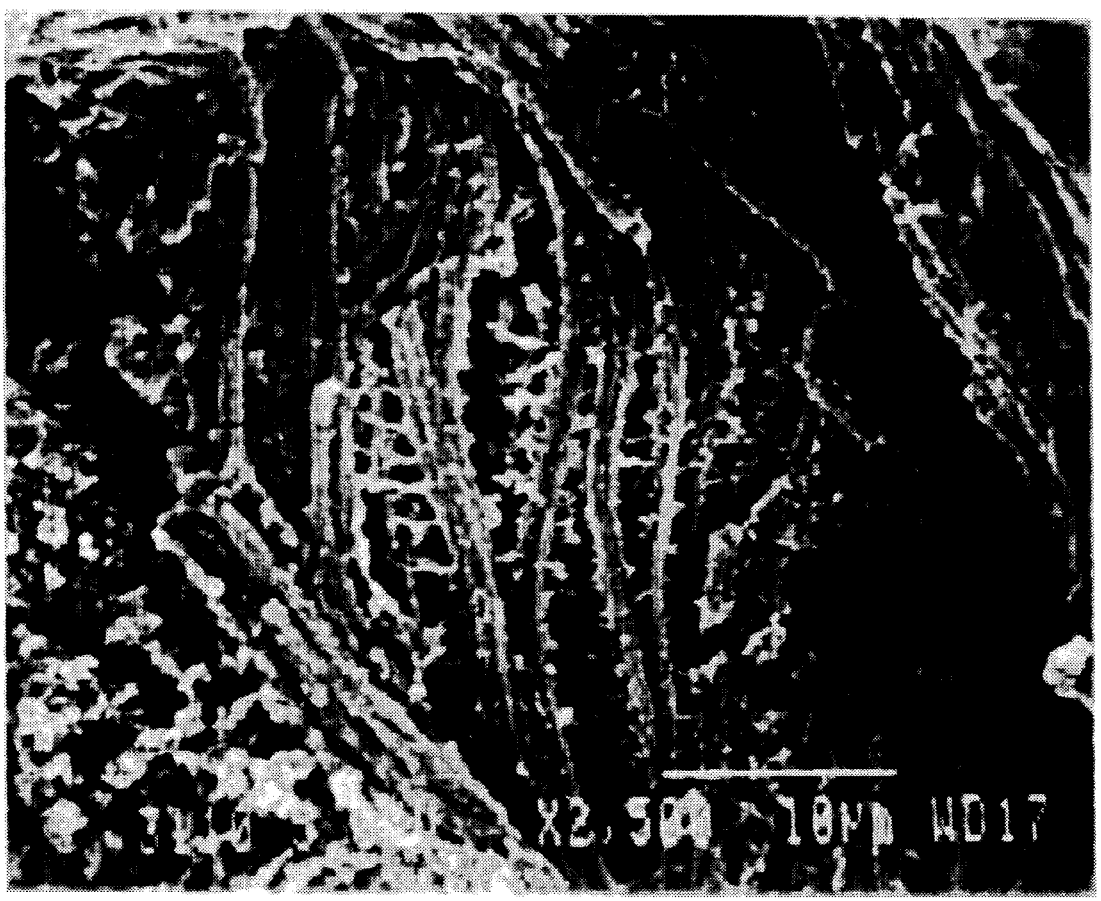
FIG. 5 is a scanning electron micrograph of bonded parts of hog muscle slices joined by the adhesive of the present invention as described in Example 3.

As a result, the hog muscle slices were strongly bonded together, and a scanning electron micrograph as shown in FIG. 5 was obtained for the undissolved part. FIG. 5 shows an image believed to be a solidified muscle fiber in the undissolved part, and thus suggests that the adhesive ingredients penetrate into the muscle tissue and polymerize to solidify, thereby forming a complex.

EXAMPLE 4

Human blood was spread on an agar, and the adhesive prepared in the same manner as in Example 1 was superimposed thereon. Thus, a solidified layer was formed.

This solidified layer was partially separated, washed with deionized water, and dried in vacuo at room temperature. The surface of the thus obtained dry solidified layer was observed by a scanning electron microscope, thereby obtaining a scanning electron micrograph as shown in FIG. 6.

Figure 6:
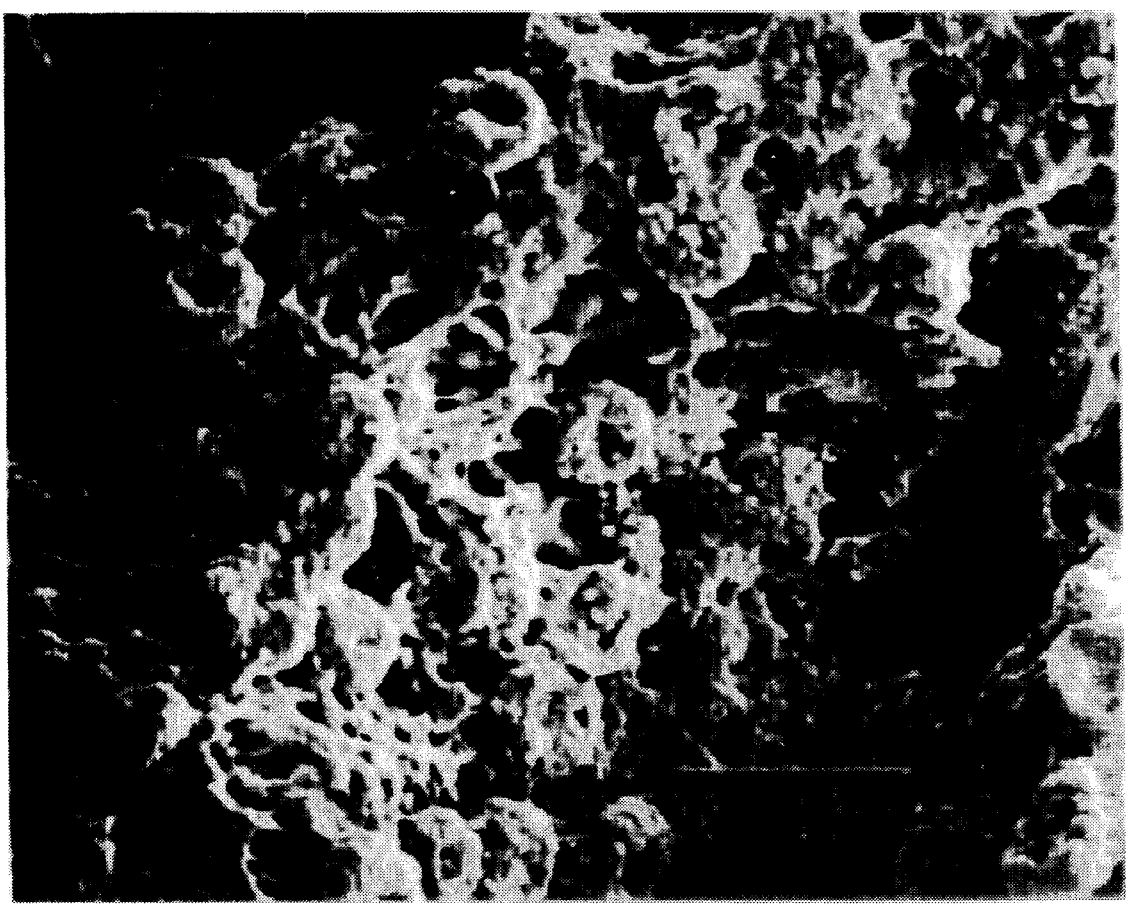
FIG. 6 is a scanning electron micrograph of a solidified layer resulting from solidification of the adhesive of the present invention together with blood as described in Example 4.

FIG. 6 shows images of erythrocytes on the surface of the dry adhesive layer, and thus suggests that the adhesive polymerizes to solidify while incorporating blood including erythrocytes.

EXAMPLE 5

Tissue slices were bonded in the same manner as in Example 2, except that blood was spread on the surface of a slice of hog liver, the adhesive was applied thereonto and another slice of hog liver was superimposed thereon.

As a result, it became unfeasible to separate the joined two liver slices at the bonded parts without tissue break.

EXAMPLE 6

The adhesive prepared in the same manner as in Example 1 was applied to the surface of a skin of a human, and solidified.

As a result, a solidified layer bonded to the skin surface was formed. At this time, no particular irritation was felt. This solidified layer spontaneously peeled in two days, leaving no adhesive traces.

EXAMPLE 7

A wound was formed on a finger of a human with a needle to realize slightly bleeding conditions. The adhesive prepared in the same manner as in Example 1 was applied to the wounded part, and allowed to stand still at room temperature.

As a result, a solidified layer including blood was formed on the surface of the skin. At this time, the pain due to the wound was eliminated.

This solidified layer spontaneously peeled in two days, in which the wound was healed. No adhesive traces were left.

EXAMPLE 8

The back of a rat was shaved, and a scalpel was plunged onto the muscle under the part of the skin exposed by the shaving to form a wound of about 1 cm in length. The edges of the wounded part were joined by knotted sutures. A zone was set so as to cover the sutured part, and the adhesive prepared in the same manner as in Example 1 was applied to the zone and allowed to stand still at room temperature.

As a result, a solidified layer including blood was formed on the surface of the skin.

This solidified layer did not peel irrespective of the absence of the protection with an adhesive plaster or the like. However, this solidified layer spontaneously peeled about four days later, by which the wound was healed. No adhesive traces were left.

Figure 7:
FIG. 7 is a scanning electron micrograph of the surface of a solidified layer formed by the adhesive of the present invention as described in Example 8.

A scanning electron micrograph of the surface of the solidified layer like a scab which lied over the wound, is shown in FIG. 7.

Figure 8:
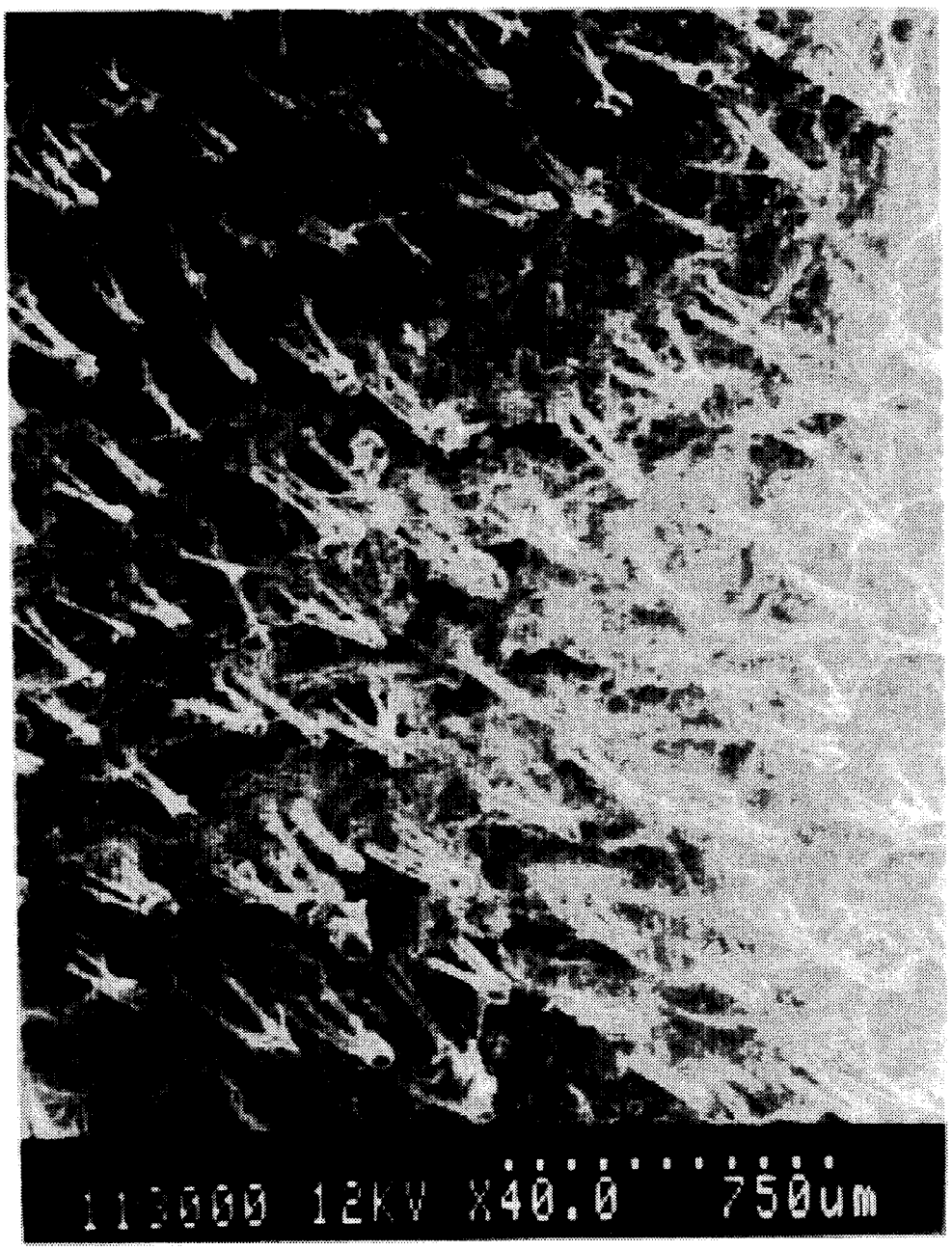
FIG. 8 is a scanning electron micrograph of the surface of a dry undissolved part obtained by taking and drying an undissolved part as described in Example 8.

The above peeled solidified layer was immersed in concentrated hydrochloric acid for one day. The undissolved materials were washed with deionized water, and dried in vacuo at room temperature. A scanning electron micrograph of the surface of the thus obtained dry undissolved part is shown in FIG. 8. FIG. 8 clearly shows an image believed to be a hair root in the undissolved part.

Therefore, it is suggested that the adhesive ingredients permeate into the skin tissue and polymerize to form a complex of tissue-polymerized adhesive with the hair root.

Comparative Example 1

The adhesive was applied and allowed to stand still at room temperature in the same manner as in Example 8, except that use was made of phosphate ester adhesive containing 10-methacryloyloxydecyl dihydrogen phosphate and N-methacryloyl- 5-aminosalicylic acid (trade name: Panavia® 21, produced by Kuraray Co., Ltd.).

As a result, no solidified layer including blood was formed on the surface of the skin. At that time, the phenomenon was observed that the adhesive adhered only to the suture knots at the wounded part.

A polymerized adhesive layer spontaneously peeled in about one or two days. Thereafter, the wound was healed, but it was found that the healing was likely to require a prolonged period of time.

EXAMPLE 9

The adhesive for soft tissue prepared in the same manner as in Example 1 was applied so as to cover a sprain of about 1 cm in length which occurred on a finger of a human, and allowed to stand still at room temperature.

As a result, a solidified layer including blood was formed on the surface of the skin. At this time, the pain due to the wound was eliminated.

This solidified layer did not peel irrespective of work with water performed without the protection with an adhesive plaster or the like. However, it spontaneously peeled four days later, by which the wound was healed. No adhesive traces were left.

EXAMPLE 10

12 Parts by weight of 4-methacryloyloxyethyl trimellitate anhydride and 231 parts by weight of methyl methacrylate were mixed to obtain a homogeneous solution. 140 Parts by weight of polymethyl methacrylate (average molecular weight: 430,000, apparent density: 0.37 g/cm$^3$) and 2 parts by weight of 4-methacryloyloxyethyl hydrogen trimellitate were added to the solution, and agitated to obtain a mixture. Subsequently, 6.5 parts by weight of tri-n-butylborane was dropwise added to the mixture at 10° C. while stirring to prepare an adhesive. The same procedure as in Example 2 was repeated except that the above adhesive was used.

As a result, it became unfeasible to separate the joined two liver slices at the bonded parts without tissue break. An observation by a scanning electron microscope showed an image similar to that of FIG. 7. This suggests that the adhesive ingredients permeate into the liver tissue and polymerize to solidify, thereby forming a complex of tissue and polymerized adhesive.

EXAMPLE 11

Figure 3:
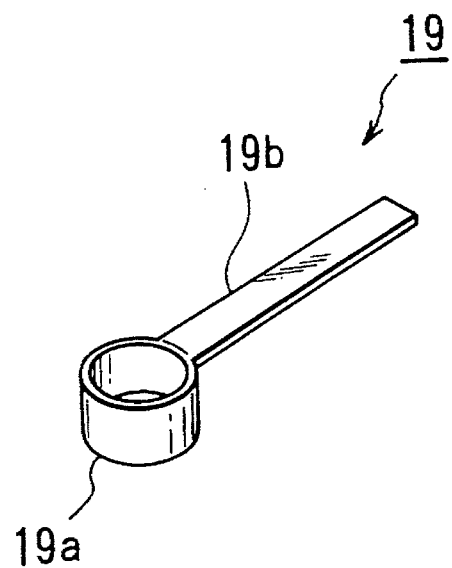
FIG. 3 is a perspective view of a measuring spoon disposed in a container for a poly(meth)acrylate.

A kit 1 of an adhesive for soft tissue as shown in FIGS. 1 to 3 was prepared. This kit 1 comprised a container 2 in which 10 ml of a mixture of 4-methacryloyloxyethyl trimellitate anhydride and methyl methacrylate (weight ratio 5:95) was placed. This container permitted dispensing of the mixture by drops each amounting to about 30 mg. Further, the kit 1 comprised a container 3 in which powdery polymethyl methacrylate (average molecular weight: 430,000, apparent density: 0.37 g/cm$^3$) was placed. A measuring spoon 19 was provided, with which 140 mg of the powdery polymethyl methacrylate was dispensed by moving a bar on the brim of a bowl portion thereof. Still further, the kit 1 comprised a container 4 in which tri-n-butylborane was placed. This container permitted dispensing of the tri-n-butylborane by drops each amounting to about 3 mg. Eight drops (about 240 parts by weight) of the above mixture were dispensed from the container 2 into a recess 27 of a pallet 6 of the kit 1. Then, from the container 3, one bowlful (about 140 parts by weight) of the powdery polymethyl methacrylate was dispensed thereinto, and homogeneously mixed under agitation by a spatula 5. Thereafter, 2 drops (about 6.5 parts by weight) were dispensed from the container 4, and mixed under agitation to obtain an adhesive.

Human blood was spread on an agar, and the thus prepared adhesive was superimposed thereon. Thus, a solidified layer was formed.

This solidified layer was partially separated, washed with deionized water, and dried in vacuo at room temperature. The surface of the thus obtained dry solidified layer was observed by a scanning electron microscope, thereby obtaining a scanning electron micrograph similar to that shown in FIG. 6. Namely, the scanning electron micrograph shows images of compressed globe-shaped erythrocytes having their surfaces covered with the dry solidified layer, and thus suggests that the adhesive polymerizes to solidify while incorporating blood including erythrocytes.

EXAMPLE 12

The adhesive prepared in the same manner as in Example 11 was applied to the surface of a skin of a human, and solidified.

As a result, a solidified layer bonded to the skin surface was formed. At this time, no particular irritation was felt. This solidified layer spontaneously peeled in two days, leaving no adhesive traces.

EXAMPLE 13

A wound was formed on a finger of a human with a needle to realize slightly bleeding conditions. The adhesive prepared in the same manner as in Example 11 was applied to the wounded part, and allowed to stand still at room temperature.

As a result, a solidified layer including blood was formed on the surface of the skin. At this time, the pain due to the wound was eliminated.

This solidified layer spontaneously peeled in two days, in which the wound was healed. No adhesive traces were left.

EXAMPLE 14

The back of a rat was shaved, and a scalpel was plunged onto the muscle under the part of the skin exposed by the shaving to form a wound of about 1 cm in length. The edges of the wounded part were joined by knotted sutures. A zone was set so as to cover the sutured part, and the adhesive prepared in the same manner as in Example 11 was applied to the zone and allowed to stand still at room temperature.

As a result, a solidified layer including blood was formed on the surface of the skin.

This solidified layer did not peel irrespective of the absence of the protection with an adhesive plaster or the like. However, this solidified layer spontaneously peeled about four days later, by which the wound was healed. No adhesive traces were left.

A scanning electron micrograph of the surface of the solidified layer like a scab which lied over the wound, was similar to that shown in FIG. 7.

The above peeled solidified layer was immersed in concentrated hydrochloric acid for one day. The undissolved materials were washed with deionized water, and dried in vacuo at room temperature. A scanning electron micrograph of the surface of the thus obtained dry undissolved part was similar to that shown in FIG. 8. Namely, the scanning electron micrograph shows an image believed to be a hair root was recognized in the undissolved part.

Therefore, it is suggested that the adhesive ingredients permeate into the skin tissue and polymerize to form a complex of hair root tissue and polymerized adhesive.

EXAMPLE 15

The adhesive for soft tissue prepared in the same manner as in Example 11 was applied so as to cover a sprain of about 1 cm in length which occurred on a finger of a human, and allowed to stand still at room temperature.

As a result, a solidified layer including blood was formed on the surface of the skin. At this time, the pain due to the wound was eliminated.

This solidified layer did not peel irrespective of work with water performed without the protection by an adhesive plaster or the like. However, it spontaneously peeled four days later, by which the wound was healed. No adhesive traces were left.

EXAMPLE 16

An adhesive was prepared in the same manner as in Example 11, and applied onto a slice of hog liver having a thickness of about 5 mm. Another slice of hog liver was superimposed on the adhesive-applied slice, and allowed to stand still at 18° C. for 1 hr. As a result, it became unfeasible to separate the joined two liver slices at the bonded parts without tissue break. An observation by a scanning electron microscope showed an image similar to that of FIG. 7. This suggests that the adhesive ingredients permeate into the liver tissue and polymerize to solidify, thereby forming a complex of tissue and polymerized adhesive.

What is claimed is:

1. An adhesive for soft tissue consisting essentially of
    (1) a member selected from (meth)acrylic esters containing an acid anhydride group represented by the following formula (I) and (meth)acrylic esters represented by the following formula (Ia) and mixtures thereof,
    (2) 1 to 100 parts by weight of a (meth)acrylate,
    (3) 0.1 to 100 parts by weight of a poly(meth)acrylate having a weight average molecular weight of 300,000 to 600,000 and
    (4) 0.01 to 10 parts by weight per part by weight of said (meth)acrylic esters of a polymerization initiator,

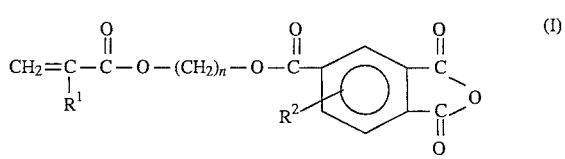

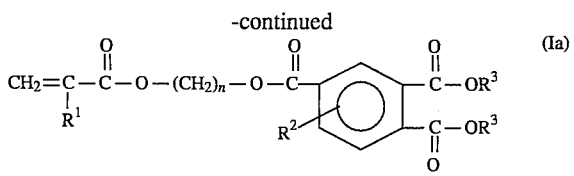

wherein n is an integer of 2 to 6; $R^1$ represents hydrogen or an alkyl group having 1 to 4 carbon atoms; $R^2$ represents hydrogen, an alkyl group having 1 to 4 carbon atoms or a carboxyl group; and each $R^3$ independently represents hydrogen or an alkyl group having 1 to 4 carbon atoms, provided that when one $R^3$ is an alkyl, the other is hydrogen.

2. The adhesive for soft tissue as claimed in claim 1, wherein the selected member is a mixture of the (meth)acrylic ester containing an acid anhydride group represented by the above indicated formula (I) and a the (meth)acrylic ester represented by the above formula (Ia).

3. The adhesive for soft tissue as claimed in claim 1, wherein n is 2 in the above formulae (I) and (Ia).

4. The adhesive for soft tissue as claimed in claim 1, wherein the (meth)acrylic ester containing an acid anhydride group represented by the above formula (I) is 4-methacryloyloxyethyl trimellitate anhydride, the (meth)acrylate is methyl methacrylate, the poly(meth)acrylate is polymethyl methacrylate, and the polymerization initiator is tri-n-butylborane.

5. The adhesive for soft tissue as claimed in claim 1, wherein per part by weight of the (meth)acrylic ester containing an acid anhydride group represented by the above formula (I) and the (meth)acrylic ester represented by the above formula (Ia), the (meth)acrylate is present in an amount of 10 to 50 parts by weight, the poly(meth)acrylate is present in an amount of 5 to 20 parts by weight, and the polymerization initiator is present in an amount of 0.1 to 2.0 parts by weight.

6. The adhesive for soft tissue as claimed in claim 1, wherein the adhesive for soft tissue is an adhesive for integumentary wound.

7. A kit of an adhesive for soft tissue, comprising containers and, placed therein an adhesive consisting essentially of (1) a member selected from (meth)acrylic esters containing an acid anhydride group represented by the following formula (I) and (meth)acrylic esters represented by the following formula (Ia) and mixtures thereof, (2) 1 to 100 parts by weight of a (meth)acrylate, (3) 0.1 to 100 parts by weight of a poly(meth)acrylate having a weight average molecular weight of 300,000 to 600,000 and (4) 0.01 to 10 parts by weight per part by weight of said (meth)acrylic esters of a polymerization initiator,

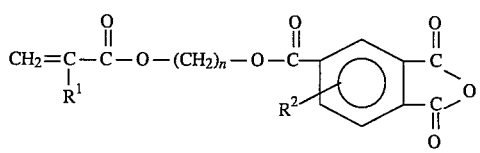

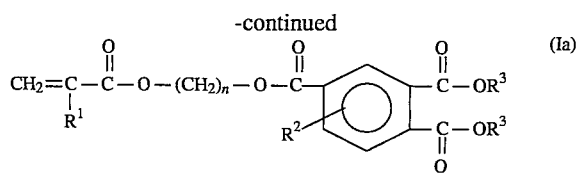

wherein n is an integer of 2 to 6; $R^1$ represents hydrogen or an alkyl group having 1 to 4 carbon atoms; $R^2$ represents hydrogen, an alkyl group having 1 to 4 carbon atoms or a carboxyl group; and each $R^3$ independently represents hydrogen or an alkyl group having 1 to 4 carbon atoms, provided that when one $R^3$ is an alkyl, the other is hydrogen.

8. The kit as claimed in claim 7, wherein a mixture of one member selected from (1) (meth)acrylic esters containing an acid anhydride group represented by the above formula (I) and (meth)acrylic esters represented by the above formula (Ia) and mixtures thereof, and the (2) (meth)acrylate is put in a single container.

9. The kit as claimed in claim 7, wherein the selected member is:

a mixture of the (meth)acrylic ester containing an acid anhydride group represented by the above indicated formula (I) and a (meth)acrylic ester represented by the above formula (Ia).

10. The kit as claimed in claim 7, wherein n is 2 in the above formulae (I) and (Ia).

11. The kit as claimed in claim 7, wherein the (meth)acrylic ester containing an acid anhydride group represented by the above formula (I) is 4-methacryloyloxyethyl trimellitate anhydride, the (meth)acrylate is methyl methacrylate, the poly(meth)acrylate is polymethyl methacrylate, and the polymerization initiator is tri-n-butylborane.

12. The kit as claimed in claim 7, wherein per part by weight of the (meth)acrylic ester containing an acid anhydride group represented by the above formula (I) and/or the derivatives of the (meth)acrylic ester represented by the above formula (Ia)

the (meth)acrylate is present in an amount of 10 to 50 parts by weight, the poly(meth)acrylate is present in an amount of 5 to 20 parts by weight, and the polymerization initiator is present in an amount of 0.1 to 2.0 parts by weight.

13. The kit as claimed in claim 7, wherein the kit is a kit of an adhesive for integumentary wound.

14. An adhesive for soft tissue consisting essentially of (1) a member selected from (meth)acrylic esters containing an acid anhydride group represented by the following formula (I) and (meth)acrylic esters represented by the following formula (Ia) and mixtures thereof, (2) 10 to 50 parts by weight of a (meth)acrylate, (3) 5 to 20 parts by weight of a poly(meth)acrylate having a weight average molecular weight of 400,000 to 500,000 and (4) 0.1 to 2.0 parts by weight per part by weight of said (meth)acrylic acid esters of a polymerization initiator,

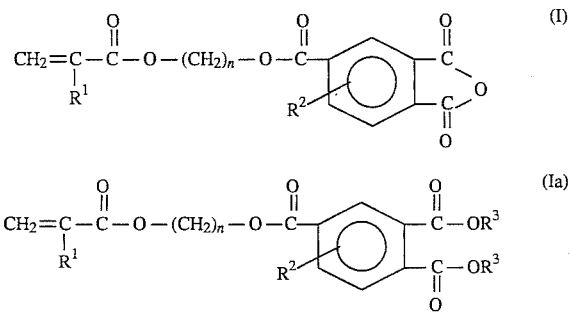

(I)

(Ia)

wherein n is 2; $R^1$ represents hydrogen or an alkyl group having 1 or 2 carbon atoms; $R^2$ represents hydrogen, an alkyl group having 1 or 2 carbon atoms; and each $R^3$ independently represents hydrogen or an alkyl group having 1 or 2 carbon atoms, provided that when one $R^3$ is an alkyl, the other is hydrogen.

15. The adhesive for soft tissues as claimed in claim 14 wherein the selected member is a (meth)acrylic ester containing an acid anhydride represented by the formula (I).

16. The adhesive for soft tissues as claimed in claim 14 wherein the selected member is a (meth)acrylic ester represented by the formula (Ia).

17. The adhesive for soft tissue as claimed in claim 14, wherein the selected member is a mixture of a (meth)acrylic ester containing an acid anhydride group represented by the above indicated formula (I) and (meth)acrylic ester represented by the above formula (Ia).

18. The adhesive for soft tissue as claimed in claim 14, wherein the (meth)acrylic ester containing an acid anhydride group represented by the above formula (I) is 4-methacryloyloxyethyl trimellitate anhydride, the (meth)acrylate is methyl methacrylate, the poly(meth)acrylate is polymethyl methacrylate, and the polymerization initiator is tri-n-butylborane.

19. An adhesive for soft tissue consisting essentially of (1) a member selected from (meth)acrylic esters containing an acid anhydride group represented by the following formula (I) and (meth)acrylic esters represented by the following formula (Ia) and mixtures thereof, (2) 10 to 50 parts by weight of a methyl(meth)acrylate, (3) 5 to 20 parts by weight of polymethyl(meth)acrylate having a weight average molecular weight of 400,000 to 500,000 and (4) 0.1 to 2.0 parts by weight per part by weight of said (methyl)acrylic acid esters of tri-n-butylborane polymerization initiator,

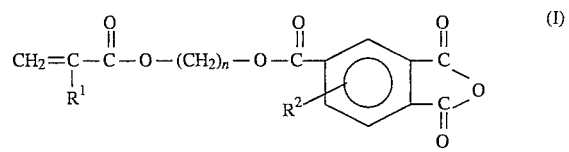

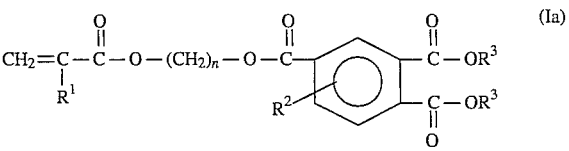

wherein n is 2; $R^1$ represents methyl; $R^2$ represents hydrogen, and each $R^3$ independently represents hydrogen or methyl, provided that when one $R^3$ is methyl, the other is hydrogen.

20. The adhesive for soft tissue as claimed in claim 19, wherein the (meth)acrylic ester containing an acid anhydride group represented by the above formula (I) is 4-methacryloyloxyethyl trimellitate anhydride.

21. The adhesive for soft tissues as in claim 19, wherein the (meth)acrylic ester represented by the above formula (Ia) is 4-methacryloyloxyethyl hydrogen pyromellitate anhydride.

22. The adhesive for soft tissue as claimed in claim 19 which is a mixture of 4-methacryloyloxyethyl trimellitate anhydride and 4-methacryloyloxyethyl hydrogen pyromellitate anhydride.

23. The adhesive of claim 19 wherein the (meth)acrylic ester containing an acid anhydride group represented by the formula (I) is 4-methacryloyloxyethyl trimellitate anhydride and is in an amount of 12 parts by weight, the methyl(meth)acrylate is in an amount of 231 parts by weight, the polymethyl(meth)acrylate is in an amount of 140 parts by weight, and the tri-n-butylborane is in an amount of 6.5 parts by weight, and wherein the polymethyl(meth)acrylate has a weight average molecular weight of 430,000.

\* \* \* \* \*